United States Patent
Machida et al.

(10) Patent No.: US 7,662,493 B2
(45) Date of Patent: Feb. 16, 2010

(54) MAGNETIC DISK SUBSTRATE AND PRODUCTION METHOD OF MAGNETIC DISK

(75) Inventors: Hiroyuki Machida, Ichihara (JP); Katsuaki Aida, Ichihara (JP); Kazuyuki Haneda, Ichihara (JP)

(73) Assignee: Showa Denko K.K., Tokyo (JP)

( * ) Notice: Subject to any disclaimer, the term of this patent is extended or adjusted under 35 U.S.C. 154(b) by 130 days.

(21) Appl. No.: 11/660,911

(22) PCT Filed: Aug. 26, 2005

(86) PCT No.: PCT/JP2005/016053

§ 371 (c)(1),
(2), (4) Date: Feb. 23, 2007

(87) PCT Pub. No.: WO2006/022446

PCT Pub. Date: Mar. 2, 2006

(65) Prior Publication Data

US 2007/0269684 A1    Nov. 22, 2007

Related U.S. Application Data

(60) Provisional application No. 60/606,417, filed on Sep. 2, 2004.

(30) Foreign Application Priority Data

Aug. 27, 2004    (JP) .............................. 2004-249096

(51) Int. Cl.
*G11B 5/60* (2006.01)
*G11B 5/66* (2006.01)

(52) U.S. Cl. ........................................ 428/848.6; 65/61

(58) Field of Classification Search ................ 428/64.3, 428/46.8, 848.6, 848; 65/30.14, 61; 51/307; 204/192.15

See application file for complete search history.

(56) References Cited

U.S. PATENT DOCUMENTS 6,113,753 A * 9/2000 Washburn .............. 204/192.15

(Continued)

FOREIGN PATENT DOCUMENTS

JP    2001-148116 A    5/2001
JP    2001-291229 A    10/2001

OTHER PUBLICATIONS

JA 2003-342556 translation.*
JA 2001-291229 translation.*

*Primary Examiner*—Kevin M. Bernatz
*Assistant Examiner*—Louis Falasco
(74) *Attorney, Agent, or Firm*—Sughrue Mion, PLLC

(57) ABSTRACT

The invention provides a magnetic disk glass substrate capable of preventing the occurrence of dust and adhesion of particles to the magnetic disk surface during a magnetic disk production process, a production method and a magnetic disk.

A glass substrate for a magnetic disk has a construction in which an outer peripheral edge shape formed around a peripheral edge portion of a main surface has, with another flat portion of the main surface being the reference:

an outer peripheral edge portion ski jump value of not greater than 0 μm;
an outer peripheral edge portion roll-off value of −0.2 to 0.0 μm; and
an outer peripheral edge portion dub-off value of 0 to 120 Å; and
the glass substrate has a chamfer surface between the main surface (data surface) and the outer peripheral edge surface (straight surface), and has an R surface having a radius of curvature of 0.013 to 0.080 mm between the data surface and the chamfer surface of the glass substrate.

3 Claims, 3 Drawing Sheets

U.S. PATENT DOCUMENTS

| | | | |
|---|---|---|---|
| 6,595,028 B1* | 7/2003 | Miyamoto et al. | 65/30.14 |
| 2001/0049031 A1* | 12/2001 | Bajorek et al. | 428/848.6 |
| 2002/0135362 A1* | 9/2002 | Lee et al. | 324/212 |
| 2002/0197437 A1* | 12/2002 | Hashimoto et al. | 428/64.3 |
| 2003/0029095 A1* | 2/2003 | Ishitobi et al. | 51/307 |
| 2003/0157292 A1* | 8/2003 | Medower et al. | 428/64.4 |

* cited by examiner

Outer Peripheral Side →

MAGNETIC DISK SUBSTRATE AND PRODUCTION METHOD OF MAGNETIC DISK

CROSS-REFERENCES TO RELATED APPLICATIONS

This application is an application filed under 35 U.S.C. §111(a) claiming benefit pursuant to 35 U.S.C. §119(e) of the filing date of Provisional Application No. 60/606,417, filed Sep. 2, 2004, pursuant to 35 U.S.C. §111(b).

TECHNICAL FIELD

This invention relates to a magnetic disk substrate and a production method of a magnetic disk.

BACKGROUND ART

Magnetic disk devices have made remarkable progress, as external storage devices for computers, owing to their superior cost/performance ratio and further growth is expected. An aluminum type substrate has been used in the past as a substrate of a magnetic disk which is mounted in the magnetic disk device, but glass substrates made of chemical tempered glass and crystallized glass have gradually gained wider application because they have high impact resistance and can easily be made flat. In other words, the aluminum type substrate can easily provide a magnetic disk having excellent magnetic characteristics but involves the problem of flatness because it suffers plastic deformation during a mechanical process such as polishing. In contrast, the glass substrate can easily be made flat because it has high surface hardness and does not involve the plastic deformation described above.

When the surface of these glass substrates is polished, protrusions of various shapes, called "ski jumps", occur in the shape of the outer peripheral edge portion owing to slight distortion, warp, polishing stress, and so forth. These protrusions make floating and moving of a magnetic head unstable and invite the occurrence of a head crash. Consequently, it is difficult to achieve a low floating height of the head and a high recording density and to enlarge a recording area.

Various studies have therefore been made to planarize the outer peripheral edge shape of the glass substrate.

For example, a method that decides the edge shape by taking a shape change, when chemical treatment is applied to the glass substrate, into consideration and provides a glass substrate, before chemical treatment, having the shape so decided (Japanese Unexamined Patent Publication (Kokai) No. 2001-167427) is possible. Another method sets a specific radial curvature (RC) on the slope of a ski jump to 50 nm or below (Japanese Unexamined Patent Publication (Kokai) No. 2003-242627). Still another method conducts polishing so that a product (Pt) of a polishing pressure (P) and a polishing time (t) falls within a certain range (Japanese Unexamined Patent Publication (Kokai) No. 2003-89459). Still another method suppresses a radius of curvature representing surface sagging of the outer peripheral edge potion at a reference length of 2 mm or 4 mm, that is arbitrarily selected, to 150 nm or below (Japanese Unexamined Patent Publication (Kokai) No. 2003-290365).

However, the inventor of this invention has found that the outer peripheral edge shape of a glass substrate for a magnetic disk involves the following problems.

To produce a magnetic disk, a base film, a magnetic recording film and a protective film are formed on a glass substrate for a magnetic disk. When any fine particles at the time of film formation of the protective film adhere to the surface of the protective film, they are removed by a burnish treatment (that brings a lapping tape into contact with the surface of the protective film by using a rubber contact roll, for example, and gently polishes the surface). In this way, the floating distance of the magnetic recording head can be reduced. However, dust is likely to fall from the tape when the tape comes into contact with the outer peripheral edge portion of the glass substrate and the resulting particles adhere to the surface of the magnetic disk, so that the magnetic disk is rejected as a rejected product in the final inspection.

DISCLOSURE OF THE INVENTION

The methods disclosed in Patent Documents 1, 2, 3 and 4 provide the effects to a certain extent in that they planarize the outer peripheral edge shape of the glass substrate, acquire planarity sufficient to achieve high density recording and expand the recording area to the peripheral edge. However, the inventor of the invention has found that they are not yet sufficient for suppressing the occurrence of the particles described above.

The invention provides a glass substrate for a magnetic disk by determining the outer peripheral edge shape of a glass substrate and can prevent adhesion of particles to the magnetic disk surface by preventing the occurrence of dust during a magnetic recording production process, a production method of a magnetic disk characterized by forming a magnetic disk layer on the magnetic disk glass substrate, and a magnetic disk.

To solve the problems described above, the invention provides the following inventions.

(1) A glass substrate for a magnetic disk, characterized in that an outer peripheral edge shape formed around a peripheral edge portion of a main surface has, with another flat portion of the main surface being the reference:

an outer peripheral edge portion ski jump value of not greater than 0 µm;

an outer peripheral edge portion roll-off value of −0.2 to 0.0 µm; and an outer peripheral edge portion dub-off value of 0 to 120 Å; and that the glass substrate has a chamfer surface between the main surface (data surface) and the outer peripheral edge surface (straight surface), and has an R surface having a radius of curvature of 0.013 to 0.080 mm between the data surface and the chamfer surface of the glass substrate.

(2) A production method of a magnetic disk, characterized in that a magnetic recording layer is formed on the glass substrate for a magnetic disk according to (1).

(3) A magnetic disk, characterized in that a magnetic recording layer is formed on the glass substrate for a magnetic disk according to (1).

The invention provides a glass substrate for a magnetic disk by determining the outer peripheral edge shape of a glass substrate and can prevent adhesion of particles to the magnetic disk surface by preventing the occurrence of dust during a magnetic disk production process, a production method of a magnetic disk characterized by forming a magnetic recording layer on the magnetic disk glass substrate, and a magnetic disk.

BEST MODE FOR CARRYING OUT THE INVENTION

Figure 1A:
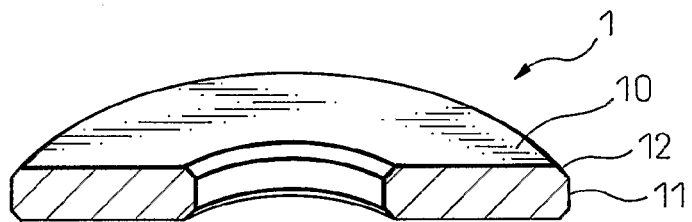
FIGS. 1(*a*) and 1(*b*) are a schematic perspective view and a schematic sectional view showing a glass substrate according to a basic embodiment of the invention.

Preferred embodiments of the invention will be hereinafter explained. However, it should be understood that the following explanation is mainly directed to concretely explain preferred examples when the invention is executed and in no way limits the invention.

Amorphous, chemical tempered or crystallized glass that has generally been used for the magnetic disk substrate can be used as the glass substrate in the invention. Examples are glasses such as soda lime, aluminosilicate, lithium silicate, lithium aluminosilicate, aluminoborosilicate, and so forth. As the chemical tempered glass, glass that is brought into contact with a molten salt at a high temperature to cause ion exchange of alkali ions in the glass with different kinds of alkali ions in the molten salt and is tempered by the compressive stress is suitable. Examples of crystallized glasses are those which are obtained by re-heating glass under a controlled condition and precipitating and growing a large number of fine crystals. Concrete examples are an $Al_2O_3$—$SiO_2$—$Li_2O$ type, a $B_2O_3$—$Al_2O_3$—$SiO_2$—$Li_2O$ type, and so forth. The thickness of such glass substrates is generally selected from the range of about 0.1 to about 2 mm.

After several pre-steps that will be described later and in detail, the glass substrate is subjected to polishing. Grinding abrasives such as cerium oxide, zirconium oxide, aluminum oxide and silicon oxide can be used as a grinding agent for polishing the surface of the glass substrate surface. Among them, the grinding abrasives formed of cerium oxide are preferably used from the aspect of polishing efficiency. The grinding agent is preferably used as a suspension prepared by suspending these abrasives in water. Therefore, washing is done sufficiently and drying is done by vapor of IPA (IsoPropyl Alcohol) to thereby give a glass substrate for a magnetic disk.

The glass substrate for the magnetic disk according to the invention has:

an outer peripheral edge portion ski jump value of not greater than 0 μm;

an outer peripheral edge portion roll-off value of −0.2 to 0.0 μm;

an outer peripheral edge portion dub-off value of 0 to 120 Å; and an R surface having a radius of curvature of 0.013 to 0.080 mm between the data surface and the chamfer surface of the glass substrate.

More preferably, the outer peripheral edge shape has:

an outer peripheral edge portion ski jump value of not greater than 0 μm;

an outer peripheral edge portion roll-off value of −0.080 to −0.180 μm;

an outer peripheral edge portion dub-off value of 40 to 80 Å; and an R surface having a radius of curvature of 0.030 to 0.070 mm between the data surface and the chamfer surface of the glass substrate.

The outer peripheral edge portion ski jump value and the outer peripheral edge portion roll-off value will be hereinafter explained in detail.

The outer peripheral edge portion ski jump value represents a value of the highest point of the outer peripheral edge shape of the glass substrate with the flat surface of the main surface of the glass substrate being the reference. The roll-off value represents the value of a point on a profile line with the flat surface being the reference surface.

Figure 1B:
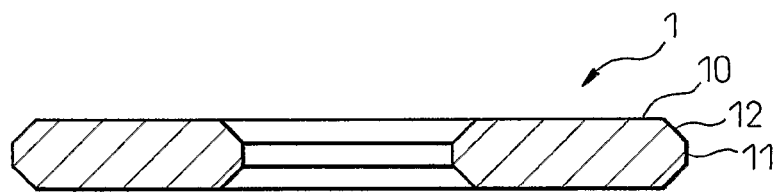
Figure 2:
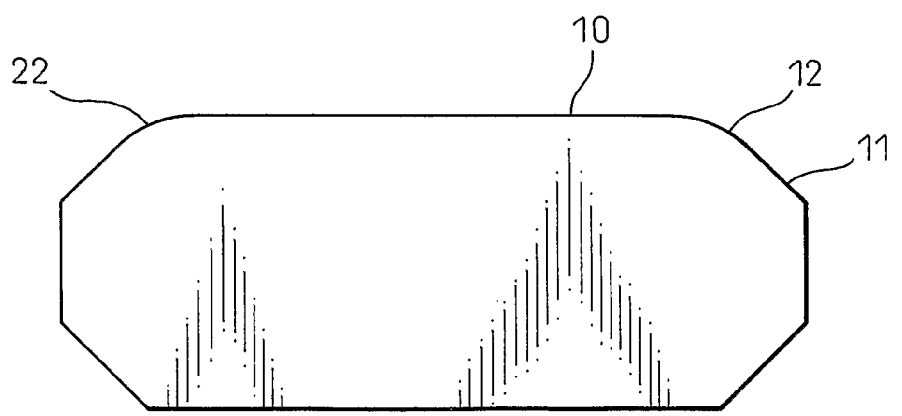
FIG. 2 is a schematic view of an outer peripheral portion shape of a glass substrate (disk).
Figure 3:
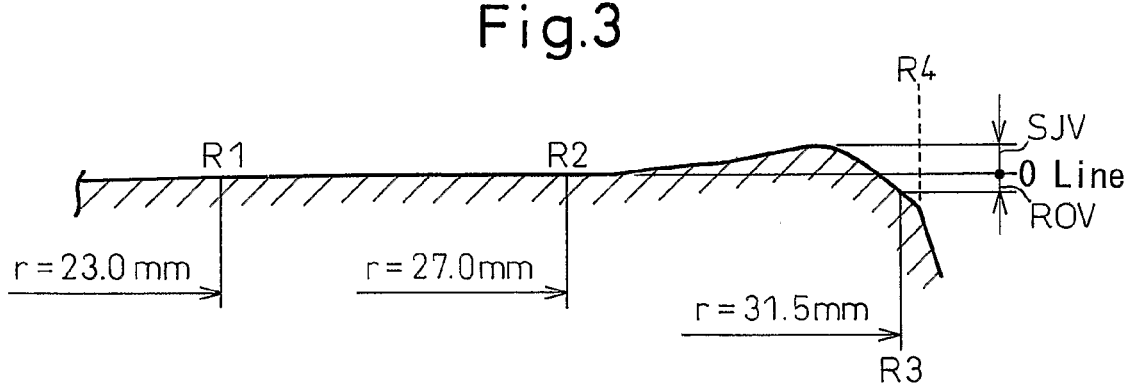
FIG. 3 is an explanatory view for explaining an outer peripheral portion ski jump value and a roll-off value.

More concretely, they are measured in the following way. FIG. 1(a) is a schematic perspective view showing a glass substrate according to a basic embodiment of the invention and FIG. 1(b) is a schematic sectional view. FIG. 2 is an enlarged sectional view of the embodiment and FIG. 3 is a schematic view of an outer peripheral edge portion shape. Referring to FIG. 3, two reference points are set inside a recording area on the profile line of the main surface and these points closer to the center are called R1 and R2, respectively. A point R3 is further set to a point spaced apart by a predetermined distance from R2 in the outer peripheral edge direction. The point of intersection between the main surface and the chamfer surface is called R4. As for the planar shape profile connecting R1 and R2, the most approximate line is determined by the method of least square and is called "0 line". The outer peripheral edge portion ski jump value (SJV) is defined as a maximum value of a displacement of the disk planar shape profile from the 0 line in an area from R2 to R4 (convex shape =+, concave shape =−). Further, the outer peripheral edge portion roll-off value (ROV) is defined as a displacement amount (convex shape =+) of the disk planar shape profile from the 0 line at the position of R3.

Incidentally, the points R1, R2 and R3 described above are suitably selected in accordance with the size of the substrate.

When outer diameter size of disk is 1.89 in. for example:
R1=14.8 mm, R2=18.8 mm
R3=23.3 mm, R4=23.88 mm When outer diameter size of disk is 2.5 in.:
R1=23.0 mm, R2=27.0 mm
R3=31.5 mm, R4=32.35 mm When outer diameter size of disk is 3.3 in.:
R1=32.25 mm, R2=36.25 mm
R3=41.434 mm, R4=41.85 mm Subsequently, the outer peripheral edge portion dub-off value will be explained in detail.

Figure 4:
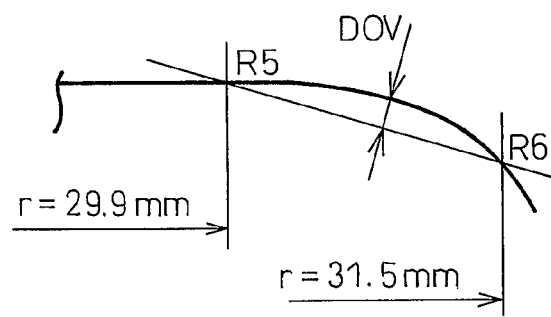
FIG. 4 is an explanatory view for explaining an outer peripheral edge portion dub-off value.

Referring to FIG. 4, two points (R5 and R6) spaced apart by 1.6 mm in the inner peripheral edge direction from the position (R4) as the point of intersection between the main surface and the chamfer surface. The dub-off value (DOV) is defined as a displacement maximum value (absolute value) to a curve R5-R6 from a straight line R5-R6 as the reference line that passes the two points. The points R5 and R6 for the outer peripheral edge portion dub-off value are suitably selected in accordance with the size of the substrate, too.

When outer diameter size of disk is 1.89 in. for example:
R5=21.4 mm, R6=23.0 mm When outer diameter size of disk is 2.5 in.:
R5=29.9 mm, R6=31.5 mm When outer diameter size of disk is 3.3 in.:
R5=39.4 mm, R6=41.0 mm Subsequently, the radius of curvature (R surface) between the data surface and the chamfer surface described above will be explained in detail.

Figure 5:
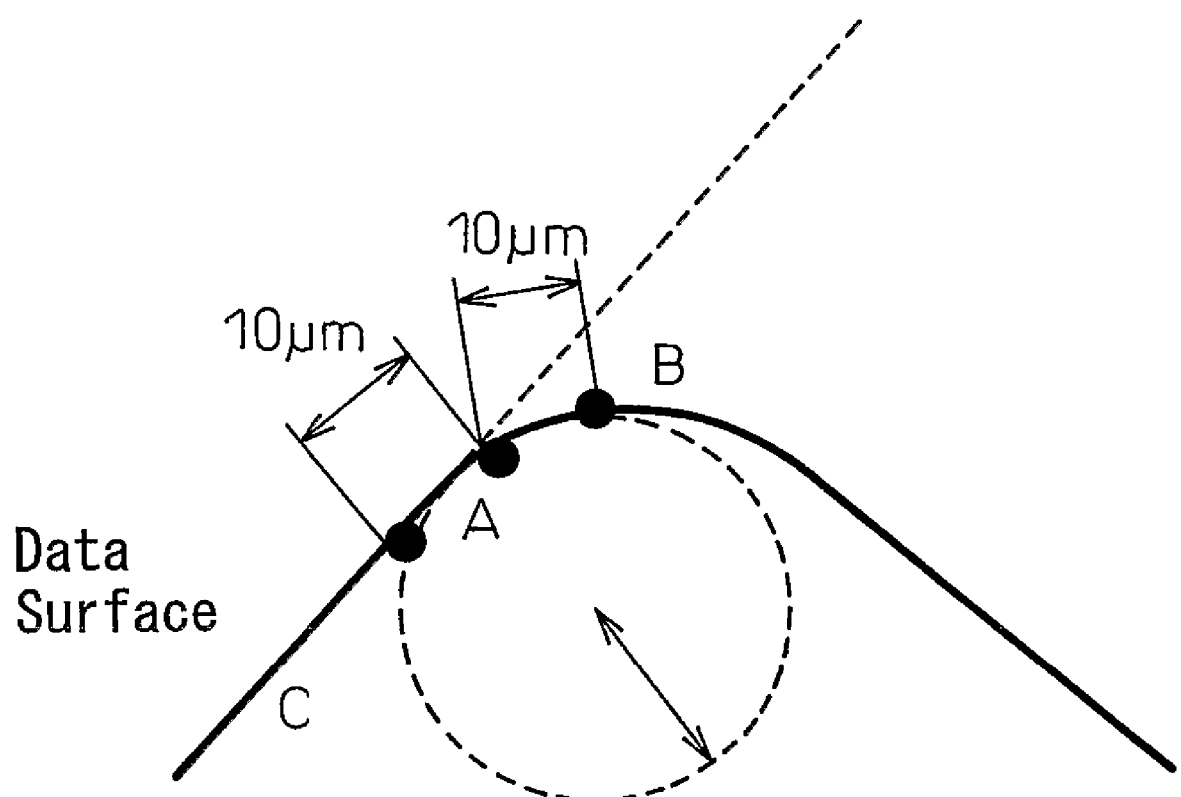
FIG. 5 is an explanatory view for explaining an R surface radius of curvature and a measurement method.

As shown in the schematic sectional view of FIG. 5, an extension line is drawn from the main surface (data surface)

of the glass substrate and a position at which the shape curve of the R surface is spaced apart from the extension line due to the radius of curvature of the R surface of the glass substrate is called "A point". Positions spaced apart by 10 μm from the A point are called "B point" and "C point", respectively. A circle passing through these A, B and C points is determined and the radius of the circle is called "radius of curvature".

The radius of curvature is measured by using a commercially available contour measuring instrument "Contracer" (product of Mitsutoyo K. K., "Contracer CP400", trade name). The measuring condition is as follows.

<Measuring Condition>
Speed: 0.06 mm/s
Pitch: 0.0010 mm
Mode: X axis fixing

The resulting glass substrate for a magnetic disk is used for the production of a magnetic disk. For example, texturing for forming texture grooves in a head traveling direction is first applied to the substrate, whenever necessary. Next, a base film made of a Cr alloy is formed by sputtering on this substrate. A magnetic recording layer made of a Co base alloy is formed to a thickness of about 10 to about 100 nm on this base film. A protective film of carbon, or the like, is preferably formed further on this magnetic recording layer to improve corrosion resistance, sliding resistance, etc. Hydrogenated carbon by sputtering or diamond-like carbon by CVD, for example, is formed to a film thickness of about 1 to about 50 nm as this carbon. Perfluoropolyether or a product obtained by esterifying or amidating the terminals of the former is diluted with a solvent and is applied by spraying, dipping, spin coating, etc to a film thickness of about 0.5 to about 5 nm as a lubrication layer to the surface of this carbon protective film, and the durability, the reliability, etc can be further improved. Subsequently, a burnish treatment by lapping tape is applied to the magnetic disk.

In this way, the invention can provide a glass substrate for a magnetic disk substrate capable of preventing the occurrence of dust in a magnetic disk production process and adhesion of particles to the magnetic disk surface and a production method for a magnetic disk characterized by forming a magnetic recording layer on the magnetic disk glass substrate, and a magnetic disk, and can improve the reliability of the magnetic disk obtained.

Though the invention will be explained in further detail with reference to Examples thereof, the invention is not limited to these Examples unless the invention exceeds the gist thereof.

A substrate for a magnetic recording medium is produced by using crystallized glass using raw materials consisting of $SiO_2$: 77%, $Li_2O$: 11%, $Al_2O_3$: 4% and MgO: 3%.

First, the raw material glass having the composition described above is molten and mixed at a temperature of about 1,350 to 1,500° C. by using a melting machine and, then, is press molded and cooled to acquire a disk-like sheet glass having a predetermined size. The resulting sheet glass is heat-treated at 540° C. for about 5 hours to form crystal nuclei and the crystals are allowed to grow at 780° C. for about 2 hours to acquire crystallized glass the crystalline phase of which consists of lithium disilicate and α-quartz and in which aggregated particles of the α-quartz are dispersed on the glass.

An inner diameter hole is bored at the center of this sheet glass by using a cylindrical grinding wheel. Two-stage, rough and fine, lapping is then applied by using a double face grinder using diamond pellets to adjust the thickness of the substrate and the surface flatness. Chamfering is done with a grinding wheel on an inner peripheral side end face and an outer peripheral side end face that face the inner diameter hole of the substrate to form a chamfer portion. Thereafter, these inner and outer peripheral side end surfaces are polished to mirror surfaces. The polishing condition is changed during mirror polishing of the outer peripheral side end phase and a glass substrate (No. 1 in Table 1) having a large radius of curvature of the R surface and glass substrates (Nos. 2 to 4 in Table 1) having small radii of curvature of the R surface are obtained.

The main surface of each of the glass substrates processed as described above is finally finished to the mirror surface by using the double face polishing machine. Two-stage polishing, rough and fine, is carried out and abrasives containing cerium oxide powder ("ROX", product of Showa Denko K. K.) are used as the abrasives. A commercially available pad of urethane or suede is selected.

The rate of revolution of a plate and a processing pressure are changed during this fine polishing and 50 glass substrates of each of four kinds, having mutually different outer peripheral edge shapes, are produced as tabulated in Table 1. Subsequently, after brush scrub washing and immersion washing are done, the glass substrates are dried and the magnetic disk glass substrates are produced.

Next, the resulting magnetic disk glass substrate is texture-treated with diamond slurry and a non-woven fabric and is loaded to a sputtering apparatus. A base film formed of a chromium alloy and a magnetic film formed of a cobalt alloy are formed on both surfaces of the substrate by sputtering and a diamond-like carbon film is formed on the surfaces by CVD. A lubricant, "Fonblin Z-Tetraol" (product of Solvay Solexis Co.) is coated as a lubricant and a magnetic disk is produced. The total thickness of the films formed by sputtering is 90 nm and the thickness of the film formed by CVD is 10 nm. Subsequent, a burnish treatment by lapping tape is applied to the magnetic disk. Fifty magnetic disks of each kind obtained in this way are inspected and the inspection yield drop due to the occurrence of dust is calculated by analyzing the inspection rejected products. The result is also tabulated in Table 1.

TABLE 1

| Sample No. | R surface radius of curvature | ski jump value | roll-off value | dub-off value | overall quality | Inspection yield drop due to dust occurrence |
|---|---|---|---|---|---|---|
| 1 | 0.060 mm | 0.0 μm | −0.13 μm | 55 Å | Passed | 0% |
| 2 | 0.005 mm | 0.0 μm | −0.13 μm | 55 Å | Not passed | −8% |
| 3 | 0.005 mm | 0.0 μm | −0.003 μm | 4 Å | Not passed | −16% |
| 4 | 0.005 mm | +0.520 μm | +0.210 μm | −145 Å | Not passed | −28% |

It can be seen clearly from Table 1 that the drop of the inspection yield due to the occurrence of dust is not observed in the sample No. 1 having an outer peripheral end portion ski jump value of 0 μm or below, an outer peripheral edge portion roll-off value of −0.080 to −0.180 μm, an outer peripheral edge portion dub-off value of 40 to 80 Å and an R surface radius of curvature of 0.030 to 0.070 mm. In contrast, the drop in the inspection yield due to the occurrence of dust is observed in the sample No. 2 having a small R surface radius of curvature. The drop of the inspection yield due to the occurrence of dust is large in the sample No. 3 having a small R surface radius of curvature and a small outer peripheral edge portion dub-off value. The drop of the inspection yield due to the occurrence of dust is the greatest in the sample No. 4 having a small R surface radius of curvature, a small outer peripheral edge portion dub-off value and moreover, an outer peripheral edge portion ski jump value of greater than 0 μm.

It can be understood from these results that the occurrence of dust in the production process of the magnetic disk and adhesion of the particles to the magnetic disk surface can be prevented by determining the outer peripheral edge portion shape of the glass substrate for the magnetic disk, and the drop in the inspection yield can be prevented.

INDUSTRIAL APPLICABILITY

The invention can provide a magnetic disk glass substrate capable of preventing the occurrence of dust, and the adhesion of particles to the magnetic disk surface, during a magnetic disk production process, a production method and a magnetic disk.

The invention claimed is:

1. A glass substrate, for a magnetic disk, characterized in that an outer peripheral edge shape formed around a peripheral edge portion of a main surface has, with other flat portion of said main surface being the reference:
   an outer peripheral edge portion ski jump value of not greater than 0 μm;
   an outer peripheral edge portion roll-off value of −0.2 to 0.0 μm; and
   an outer peripheral edge portion dub-off value of 0 to 120 Å; and that
   said glass substrate has a chamfer surface between a data surface of the main surface and a straight outer peripheral edge surface, and has an R surface having a radius of curvature of 0.013 to 0.080 mm between said data surface and said chamfer surface of said glass substrate,
   wherein the radius of curvature is defined as the radius of a circle passing through points "A", "B" and "C", wherein the points "A", "B" and "C" are determined with respect to an extension line that is drawn from the data surface of the main surface of the glass substrate, a position at which the curve of the R surface is spaced apart from the extension line due to the radius of curvature of the R surface of the glass substrate is called "A point", and positions spaced apart by 10 μm from the A point are called "B point" and "C point," respectively, and
   wherein, the outer peripheral edge portion dub-off value is determined with reference to two points (R5 and R6) that are spaced apart by 1.6 mm in the inner peripheral edge direction from a position (R4) which is the point of intersection between the main surface and the chamfer surface, and the dub-off value is defined as a displacement maximum absolute value to a curve R5-R6 from a straight line R5-R6 as the reference line that passes the two points;
   wherein the points R5 and R6 for the outer peripheral edge portion dub-off value are suitably selected in accordance with the size of the substrate;
   wherein when the outer diameter size of the disk is 1.89 in.:
     R5=21.4 mm, R6=23.0 mm;
   when the outer diameter size of the disk is 2.5 in.:
     R5=29.9 mm, R6=31.5 mm; and
   when the outer diameter size of the disk is 3.3 in.:
     R5=39.4 mm, R6=41.0 mm.

2. A production method of a magnetic disk, characterized in that a magnetic recording layer is formed on said glass substrate for a magnetic disk according to claim 1.

3. A magnetic disk, characterized in that a magnetic recording layer is formed on said substrate for a magnetic disk according to claim 1.

* * * * *